Oct. 3, 1967   J. WOTSCHKE   3,344,758
APPARATUS FOR THE THERMAL DECOMPOSITION OF WASTE PRODUCTS
Filed Dec. 5, 1963   4 Sheets-Sheet 3

Oct. 3, 1967 J. WOTSCHKE 3,344,758
APPARATUS FOR THE THERMAL DECOMPOSITION OF WASTE PRODUCTS
Filed Dec. 5, 1963 4 Sheets-Sheet 4

United States Patent Office 3,344,758
Patented Oct. 3, 1967

3,344,758
APPARATUS FOR THE THERMAL DECOMPO-
SITION OF WASTE PRODUCTS
Johannes Wotschke, Guntherstrasse 26,
Hannover-Waldhausen, Germany
Filed Dec. 5, 1963, Ser. No. 328,325
13 Claims. (Cl. 110—18)

This invention relates to the disposal of waste products and more particularly to the combustion thereof. The invention is particularly concerned with apparatus and methods for the disposal of waste products.

The ever increasing consumption of consumers' goods to satisfy consumers' requirements, and the steadily increasing adjustment of such goods to the ever changing desire for improvement has resulted in a corresponding increase of waste material resulting from this change in economy and consumption and in the fact that such waste materials are of an ever increasing variety and of practically limitless composition. Accordingly, the treatment of these waste materials, generally referred to as "refuse" resulting from consumers' goods, has become a problem of present day engineering whose importance is ever increasing.

The progressive improvement of technical processes to solve general problems in industry also produces the inevitable result that the pre-selection of the raw materials, the processing of same and the consumption thereof by the final consumer produce an ever increasing mass of industrial waste materials in solid, liquid, as well as gaseous form.

Whereas the domestic or industrial use of the substances is generally directed at so-called economic purposes and can, accordingly, be controlled to a greater or lesser degree, the term "refuse" characterizes, so to speak, the opposite, namely, something undesirable which is not covered by the rules of an orderly economy. Accordingly, the problems connected with the treatment of these waste materials have long been neglected. For economic considerations, the necessity of incorporating, for example, industrial refuse, in the corresponding work operation becomes more and more important. The elimination and, in addition thereto, the utilization of domestic refuse has become a problem whose vital necessity is recognized by the authorities dealing with water, ground and air hygiene.

Past solutions to this problem with conventional means have generally been found to be insufficient. The century-old habit of collecting and utilizing biologically convertible waste materials by modern composting processes can be used, as far as it can be carried out at all on an economic basis, for only a portion of the domestic refuse, and can, as a rule, not be used at all for industrial waste.

The age-old solution of burning refuse is today subjected to ever more strictly imposed rules and regulations owing to the adverse results and effects obtained, such as, for example, air pollution.

Moreover, known furnaces having grate or drum appurtenances are are to burn only a specific portion of the refuse, namely, that portion whose fuel character corresponds substantially to the characteristic requirements demanded by the kind of furnace. But the amount of the waste burned is always only a fraction of the total refuse.

Industrial and domestic refuse is not a "fuel" within the meaning of the term as used in the art and consequently, the conventional firing or furnace devices can be used in special cases only. These devices are not suited to solve the question of the treatment of refuse by thermal means. As far as the conventional firing or furnace devices are concerned, the refuse has, to start with, an excessively low or high calorific value, has too much water or ash, or too high a proportion of synthetic materials, oils, residues of the motor fuel industry or of the varnish industry. In addition, the unlimited composition of the non-combustible material, the so-called ash, results in pyrotechnic difficulties, namely, in unforeseeable, generally low melting points, which interfere with the operations in view of mechanical grate constructions or ceramic drum linings. In the conventional combustion devices, said melting points necessitate pyrotechnically uneconomical, low furnace temperatures, which make universal solutions impossible. The behavior of the fuel, for example, the very sudden change of the viscosity in plastics within narrow low temperature ranges offers extraordinary difficulties in the kind of furnaces which, such as a burner in the case of liquid fuels, a shaft feeder in the case of solid fuels, are dependent on an approximately uniform rheological behavior of the refuse.

Accordingly, the field of thermal treatment of refuse is characterized, almost exclusively, by compromise solutions, such that, in each particular case, only a certain group of waste materials is burned to a more or less satisfactory degree, as a rule only to a specific stage—which is called, for example, volume reducing incineration. The necessary limitation of the furnace temperature causes high plant expenses and produces, as a rule—as in the case of oil-bearing earths—doubtful hygienic end results.

In contra-distinction thereto, the present invention can be considered as a completely novel universal process in the field of thermally treating refuse, characterized in that it practically completely decomposes in the same device in which the process is carried out refuse of any kind whatsoever, whether solid, liquid or gaseous, of any heating or calorific value, whether very low, such as, for example, in the case of ashes or even negative, such as, for example, in the case of moisture or high values as in the case of plastic and oil wastes. The refuse is converted on the one hand, into dust-free smoke or flue gases and, on the other hand, into a practically fused mass of non-combustible matter. The present invention obtains this result by a smaller technical-economical expenditure as far as construction and process are concerned, owing to the fact that, in a unique manner, without using grates or drums, the refuse is heated to a temperature level only required for the decomposition, and not exceeding said temperature and the refuse forms a thin surface reaction layer which acts at the same time as a protective layer for the jacket or casing in which the material is fed and in which is formed a flame chamber. The reaction layer largely limits the usual structural expenditure for providing protection against loss of heat as well as against destruction of the casing.

Consequently, when compared with known methods of eliminating refuse, the process according to the present invention offers the extraordinary advantage of being able to process practically universally all waste materials in a single device, of decomposing said waste materials practically completely into the final state that can physically be obtained, and of bringing about these advantages with a practically never attained low economic expenditure of means.

These advantages also enable the process to be applied to the treatment of material which, because of previously encountered difficulties of being treated, had to be considered economically unusable. Such material includes, for example, fine ores from deposits that were heretofore uneconomically exploited.

It is therefore a principal object of the invention to provide a process which is adaptable for the complete combustion of all types of products.

The invention will now be explained in detail by way of the embodiments shown in the accompanying drawings, wherein.

The same reference characters have been used for similar elements in each of the figures of the drawing.

Figure 1:
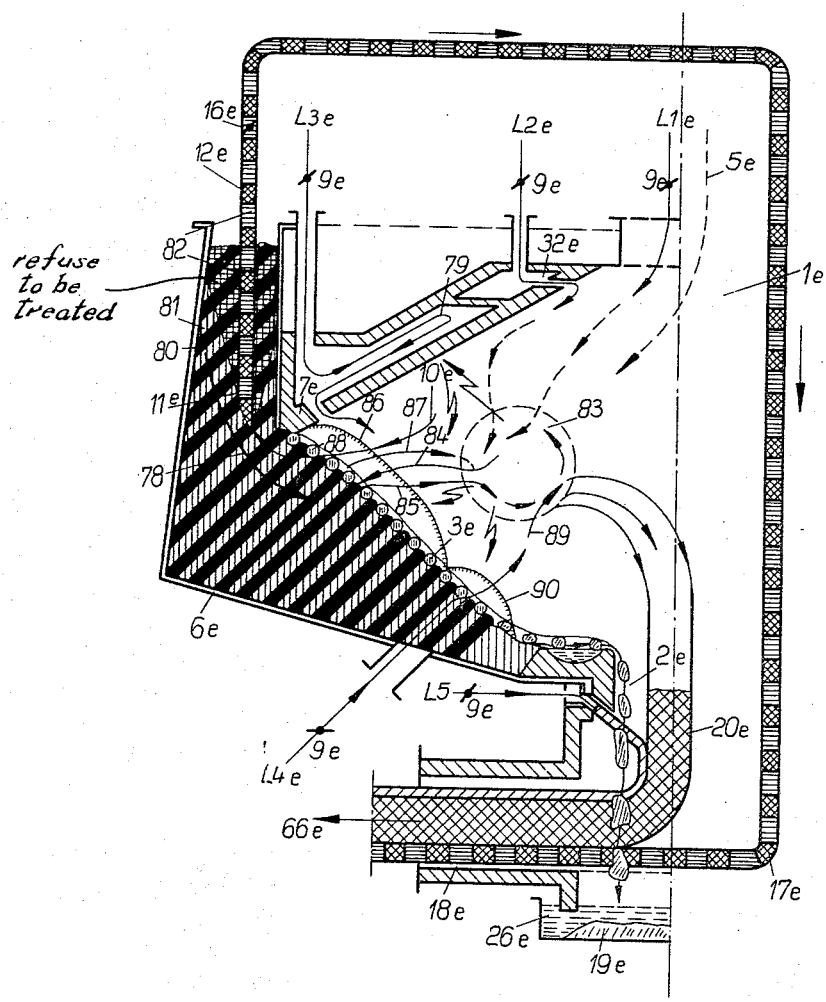
FIG. 1 is a detailed showing of the reaction processes at the surface layer of the material in the flame chamber, only half of which is shown.

The invention contemplates the use of a hollow space defining a flame chamber which is bounded at the top by a reflecting roof and in which is formed a natural funnel of the material being treated whereby the decomposition reactions develop and are consumated in and on the surface layer or the material under the influence of the heat radiation in the flame chamber, and whereby the required conversion of energy takes place in said surface layer so vigorously and so extensively that there is substantially no outward dissipation of the energy radiation beyond the surface layer. During this operation, the flame chamber is maintained, by a heat source constituted by a flame, at a temperature which is sufficient to liquefy, at least partly, the waste material fed into the chamber and which continuously supplements the surface layer which is being consumed in the reaction. The liquefied waste material is discharged downwardly together with a portion of the gaseous products through a central outlet in the bottom of the casing which contains the chamber. This method offers the possibility of maintaining in the thus developed flame chamber the optional temperature required for the suitable treatment of the respective material, and to do so in a heretofore unknown economical manner, without the previously customary restrictions being imposed by the wall lining and the bottom, since the material being treated actually forms the very boundaries of the flame chamber and serves to insulate the casing in which the material is fed. Accordingly, the present method ensures a close connection between the working conditions imposed by the material, on the one hand, and the possibilities of the apparatus as ensured by the material, on the other hand. This relationship undergoes no change with varying material.

The obtaining of the heating energy required in each particular case and the kind of energy utilized is not subject to any restriction whatsoever. For example, the heating flame provided for this purpose may be the sole supplier of energy; on the other hand, said supplier of energy may be the material to be treated. It is possible to admix with the latter a special energy carrier, for example, oil that is added to low-energy material.

By virtue of the at least partial withdrawal of the gaseous and liquid products of the process through a central bottom outlet of the flame chamber ensures simple, and continuous control of the process.

Since the variety of the materials to be treated in the flame chamber naturally require energy of different levels in said flame chamber, the volume of the flame chamber can be varied as to its height to be adapted to this requirement.

Since it is known that the removal of special gaseous reaction products from the reaction zone is a prerequisite to the orderly and rapid progress of a reaction, the present method provides that a portion of the reaction gases be occasionally removed upwardly. If this is done, such gaseous reaction products may partly be fed directly to the heating flame and may thus be utilized in the process itself. In such cases, it may be expedient to assist this procedure by drawing in the gaseous reaction products and directing the same to the heating flame.

On the other hand, such gaseous reaction products may be used for the drying and pre-drying of the reaction material. In this case, it is appropriate to guide the reaction products in counterflow through the reaction material, as the latter progresses towards the flame chamber. If this is done, for example, in a feed shaft and if, for example, the flame chamber is kept under excess pressure, it will be possible to obtain the result that the reaction gases conducted upwardly in counterflow through the reaction material release and remove from the latter moisture and, possibly, other volatile constituents and reduce the energy requirement in flame chamber. The simultaneously occurring pre-heating of the reaction material in the feed shaft can also be effected by heat exchange along its walls. In this case, it may be expedient to agitate the material in the feed shaft, in order to keep the material open to allow passage of the gas therethrough. Such movement may also be of advantage to control the flow of the material into the flame chamber. This movement may, for example, be obtained by shaping portions of the feed shaft and the casing and by providing on the casing, if desired, catches engaging the material to be treated in the shaft. Such catches may also be so fashioned to mechanically remove residues which exist as components in the starting material and which remain solid during the reaction in the flame chamber. The casing may be rotated to effect the agitation. The waste gases from the material in the feed shaft may be conducted through the material whereby the gases may absorb additional substances from the material, for example, water, or may deposit such substances therein, for example, dust. It may be expedient to close the feed shaft of the material at the top and to provide special outlets for the waste gases, which may be, for example, lateral outlets.

If the waste gases are useful in the process, for example, due to a high proportion of combustible matter, or if they are to be superheated, for example, for the purpose of being deodorized, it is desirable to combine the waste gases with the reaction gases which are discharged directly from the flame chamber and which are thereby as a rule hotter than the waste gases. This combination may be carried out in a post combustion chamber connected to the flame chamber. The controlled supply of, for example, oxygen may effect, in said post combustion chamber, a controllable and thorough combustion of the combined total waste gases being discharged from the process. This produces the result that the waste gases, for example, those from the feed shaft, and the reaction gases directly leaving the flame chamber occur, either separately or combined, in a state which facilitates their post treatment, especially their utilization. Said post treatment may consist of a withdrawal of specific components, such as, for example, purification and detoxication, or may consist in utilizing their heat content. For this purpose, a waste-heat boiler may be arranged or connected beyond the flame chamber or post combustion chamber, or the latter may itself be formed as a waste-heat boiler.

On the other hand, the flame chamber may also be formed and operated in such a manner that waste fuels, without having been specially prepared outside the process, are used and burned in the flame chamber in such a manner that the reaction gases directly deliver their heat subsequently to a conventional boiler system. In this case, the flame chamber becomes consequently, the furnace thereof.

In this mode of operation it is expedient to subdivide the supply of air to the flame chamber, and, respectively, to the post combustion chamber.

This subdivision may be effected, for example, in such a manner that a first partial amount of the air is fed directly to the heating flame, while a second partial amount is allowed to enter the flame chamber from the top revolving about the heating flame. A third partial amount may be so guided that it sweeps from the side of the flame chamber over the material forming the wall lining, while a fourth partial amount is guided through said material from the outside in the direction toward the flame chamber. A fifth partial amount may be admixed, directly at the outlet, with the reaction gas leaving the flame chamber through the central outlet in the bottom of the chamber while a sixth partial amount is introduced, as already described, into the post-combustion chamber for regulating the final thorough combustion. Said partial amounts will be regulated very accurately, and the total amount of air supplied will also be adjusted accurately to the total requirement needed in each particular case.

The waste material to be charged naturally present a number of problems for the treatment, and they also open a great variety of possibilities. It may, therefore, be advisable to add to such material those materials which facilitate the treatment. The material thus added may under certain circumstances increase the variety of the possibilities of utilizing the refuse treated.

For example, it is desirable to add more easily fusible materials to starting waste material which fuses with difficulty, in order to lower the melting point of the discharged melt.

If the material in question is a waste fuel having a high ash content, the ash in this process will continually run off from the fuel in the flame chamber as a thin film to the central outlet and will continually expose new portions of the fuel material to the energy radiation and oxygen of combustion. This method substantially facilitates a rapid progress of the reaction. Accordingly, the process makes it possible to treat or react in a particularly economic manner precisely those materials which could not be treated in previously known processes because the material was too small, such as, for example, grindings, dust, fines, and the like which would have to be firstly specially crushed or briquetted.

The above-described preliminary treatment in the feed shaft is a chemical-physical preliminary treatment which is obtained with coarse material. The fact that the discharge takes place automatically in the flame chamber because of the fusibility, makes it necessary that, for example, coarse pieces require a somewhat retention longer time while fine material charged at approximately the same time is spontaneously heated to a high temperature passing from the solid dust-like initial state to the liquid phase owing to its large specific surface, whereby it coagulates to form drops, and forms the above-described liquid film.

Said film serves as a filter for the gaseous reactants flowing from the material from the outside through said film inwardly in the direction of the central outlet and causes said reactants to enter into chemical and physical reactions with said film, either by depositing dust particles or by converting gas particles such as sulfur into their liquid inorganic compound, for example, in this case, sulfate.

Accordingly, the present process is especially well suited for directly melting down ultrafine refuse separated in dust collectors, either with the addition of materials improving their value or with subsequent reflux into the dust-yielding original process. For example, the conventional shaft furnace offers the possibility of using the device according to the application as an additional device for the immediate and direct remelting of separated blast-furnace dust for possible re-use in the original process in an economical manner. Such devices will be used for waste materials which could not be utilized for shaft furnace operations in the past for economic reasons and which were therefore rejected. Examples of such material is scrap or waste resulting from ore deposits, and from ore disintegrating processes, such as, for example, fine-grained ore mixed with carbon fines or with oil. The present process will naturally offer special possibilities if the waste to be treated contains metallic oxides, from which metals are liberated by the reaction in the surface layer according to the invention. Since the metals, owing to their greater density, separate downwardly in the melt, they may be removed through a special siphon drain, separately from the melt flowing out through the central outlet.

In the case of liquid waste, such as, for example, sewage sludge, the waste will be predried by waste gases from the process before it enters the flame chamber, where a surface layer is also formed serving as a covering which insulates the walls of the casing. However, the removal of water may also be effected prior to delivery in a spray dryer, through which the liquid material has first been conducted and is dried by means of the gases of reaction leaving the reaction chamber.

FIG. 1 diagrammatically indicates the process, effected according to the invention, of burning and/or decomposing the waste materials in the surface layer $3e$, special attention being drawn to the differences of a conventional melting process in melting furnaces wherein the cooperation of gas-generating substantial fuel portions in the material being treated is not provided.

FIG. 1 is a cross-sectional view of the left half of a device according to the invention, having an outer jacket or casing $6e$, a vertically displaceable body $7e$ with a downwardly reflecting arched roof, and an annular feed shaft $11e$ formed between the casing $6e$ and the body $7e$. The waste material to be treated moves in the shaft $11e$ in the direction of the arrow 78 downwardly toward the flame chamber $1e$ and is discharged at outlet $2e$ in the form of reaction gases $20e$ and liquid melt $19e$. The reaction gases $20e$ are fed to the boiler $66e$ and the melt $19e$ is fed to the post treatment device $26e$. $L_{1e}$ represents the air supply, which is controlled by valve $9e$ and is led to the central heat source $5e$. $L_{2e}$ represents the amount of air flowing by way of guide plates $32e$ spiralling downwardly on the inside of the body $7e$ while $L_{3e}$ represents the amount of air which regulated by valve $9e$ enters, by way of chamber 79 beneath the arched roof, to extract heat therefrom. $L_{4e}$ represents the air passing through the material to be treated, while $L_{5e}$ is another portion of the air which cools, for example, the ceramic lining of the central outlet $2e$. The air $L_{5e}$ is introduced at said ceramic lining into the reaction gases $20e$ for the final thorough combustion of the latter.

The obliquely hatched portion shows the material to be treated. The black oblique lines 80 indicate diagrammatically the pure fuel portion which is completely converted into gas by the combustion process. The vertically hatched oblique gaps 81, on the other hand, indicate the non-combustible matter which finally leaves at the outlet $2e$ in the form of melt $19e$. In the top portion of the annular shaft $11e$, in a downwardly acutely extending region, this portion 81 is additionally cross-hatched to indicate that the material still contains moisture 82. However, this moisture is absorbed in the acutely downwardly extending drying region by the partial gas current $10e$ ascending from the flame chamber and redirected by valve $16e$ and pipe $17e$ into the post-combustion chamber $18e$ where it is combined again, by-passing the actual flame chamber $1e$, with the waste gases $20e$ of the latter before they are discharged to the boilers $66e$. $3e$ represents the surface layer of material of the natural sloping funnel, which is heated directly from the center of radiation 83, i.e., the flame center, and by way of the reflecting arched roof $7e$ indirectly to be thus supplied with heat energy.

In a simple melting process, the influence of the energy radiation on the surface $3e$ would continue through said surface and externally of the casing due to the natural heat conductivity of the material and would heat an ever increasing depth zone, would sinter the same and cause the same to melt and would even enter, in a manner known from shaft-furnace operations, the annular shaft $11e$ and ascend therein. The sole means to prevent this natural tendency of flow is the heat absorptivity of the material flowing in counter-current, in this case without fuel. The heat absorptivity of this material is as a rule not sufficient and not controllable. In contradistinction thereto, a characterizing feature of the surface layer $3e$ according to the invention consists in that, on the one hand, it has an extraordinary intrinsic energy requirement thereby absorbing the radiated energy in a small surface area, while on the other hand, the energy requirements can be additionally controlled according to the features of the invention.

According to experience, in agreement with the knowledge of combustion theory, the following procedure takes place in the arrangement according to the invention.

The surface layer $3e$ is located between the actual fuel surface and the actual surface of combustion. If the moisture is withdrawn from the waste, which will temporarily be called the material to be burned, by the partial current of gas $10e$ in the annular shaft $11e$, the temperature of the material to be burned then starts to rise above 100° C., to a temperature approximaely upon its entering the region of the energy radiation of the flame chamber. During this operation, surface layer $3e$ first reaches the region in which the volatile constituents 87 are released from the material to be burned, said volatile constituents entering the flame chamber absorb heat from the center of radiation 83 and thereby diminish the outflow of heat.

If the energy radiation of flame 83 is sufficiently strong, as for example by suitable adjustment of the volume of the flame chamber, the non-combustible constituents 81 of the material to be burned are simultaneously heated to the melting point and flow downwardly, in the form of drops 88, from said "low-temperature carbonization zone" 86 towards the central outlet. Due to this process, the drops enable the heat consuming low-temperature carbonization process intensively to consume an increasing amount of heat by repelling at the surface $3e$ increasingly large amounts of low temperature carbonization gas 87 inwardly, in such a manner that the heat is even more rigorously prevented from escaping outside. In addition, the continuous withdrawal of the drops 88 increasingly exposes the actual fuel portion 80 in the material to be burned. Accordingly, the $CO_2$, designated as 84, arriving from the combustion flame 83 is increasingly able to contact this exposed combustible material (carbon) at the fuel surface $3e$ and will be converted to CO according to the equation:

(1)     $CO_2 + C = 2CO - 38,400$ kcal./kmol.

The resulting CO, designated as 85, returns as fuel gas from the fuel surface to the actual combustion surface in the direction toward the flame center 83. As regards the energy, it is to be noted that the process (represented by the Equation 1) at the fuel surface $3e$ is also endothermic, thereby preventing the heat from flowing outside of the casting. The actual combustion takes place only above the surface layer $3e$ or in the region of the flame 83 according to the equation:

(2)     $2CO + O_2 = 2CO_2 + 135,400$ kcal./kmol.

The above combustion is exothermic, whereby the thermal energy developed during this process radiates from the flame center 83 directly or indirectly by way of the reflecting arched roof $7e$ onto the surface layer in accordance with the invention. In order to have this process proceed intensively, as described above, it is necessary, according to the invention, to interrupt the access of air to the surface layer, said access of air being unnecessary for the low-temperature carbonization process according to Equation 1 and even interfering by its own requirement of heating-up heat, a process which is not realized, for example, at the conventional grate or drum furnaces. On the other hand, the air required for the actual flame 83 according to Equation 2 must be fed above the surface layer $3e$ and even, if possible and according to the invention, pre-heated. This is done, according to the invention, for example, by the controlled air paths $L_{1e}$, $L_{2e}$ (as shown in the drawing) and by preheating, for example, in the chamber 79, or outside the system. If the endothermic release of volatile constituents, as described by the Equation 1, at and from the surface layer $3e$, e.g. in the region 86, is completed, i.e. if the actual reaction process and energy consumption according to the invention is limited to the surface layer $3e$, there still remains therein flowing in a downward direction carbon particles (constituents) 80, which are neither carbonized at low temperature nor gasified by the supply of energy or by supply of $CO_2$ according to Equation 1. Accordingly, the invention provides that an amount of air $L_{4e}$ is fed to said carbon particles 80, in a controlled manner, through the material to be burned, in order to gasify this generally glowing residual coke carbon according to the equation:

(3a) 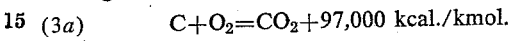    $C + O_2 = CO_2 + 97,000$ kcal./kmol.

or (3b)     $C + O = CO + 29,300$ kcal./kmol.

the former having the greater, and the latter having the smaller heat of reaction. As is known, there is a shift from the greater to the smaller heat effect, i.e., from Equation $3a$ to Equation $3b$, according to Le Chatelier's principle of least constraint, with increasing temperature. Consequently, Equation $3b$ with the end product CO, designated by numeral 89, is more likely to take place in the lower region 90 of the surface layer $3e$ and will displace the final combustion of the CO according to Equation 2 into the flame chamber 83 above the surface layer $3e$, i.e., out of said surface layer $3e$. This process is caused and supported by the high radiation temperature or high energy density in the flame chamber $1e$, as provided according to the invention. In addition thereto, and according to the invention, the air feed $L_{4e}$ serves the purpose of pushing the CO-gases 89 developed preferably according to Equation $3b$, due to flow theory, away from the surface $3e$ into the flame chamber $1e$ and of stopping in this manner, from the outset, in "counter shock," the attempt of the radiated energy to escape through the surface layer $3e$.

Thus, the above-demonstrated method of operation at the surface layer $3e$ according to the invention constitutes an excellent protection against loss of heat to the outside from an economic viewpoint as well. On the other hand, the hatched material, which is present below or outside the surface layer $3e$, practically does not participate in the process. It remains untouched, non-decomposed and unburned as a base filling. The inflow from the annular shaft $11e$ flows over and past into the reacting surface $3e$.

It is typical for the above-described processes at the surface $3e$ that they proceed the more reactively and the more rapidly, as well as the more precisely, the stronger the energy radiation. These processes thereby limit all the more accurately the thickness of the surface layer and stop the outflow of heat to the outside; but they feed fuel gases in a correspondingly stronger manner, into the energy reflecting flame center 83. When the process is carried out in this manner according to the invention, the reaction velocity and the reaction conversion increase, so to speak, automatically by reciprocal effect, establish the industrial efficiency of the entire procedure in an unusually small reaction chamber. This knowledge and its realization by the measures described according to the invention, especially as regards the above-described strong intermixing of the fuel gases ascending from the surface $3e$ with the appropriately guided air paths $L_{1e}$ and $L_{4e}$ to the turbulent flame of combusion 83, are characterizing features of the present invention.

Figure 2:
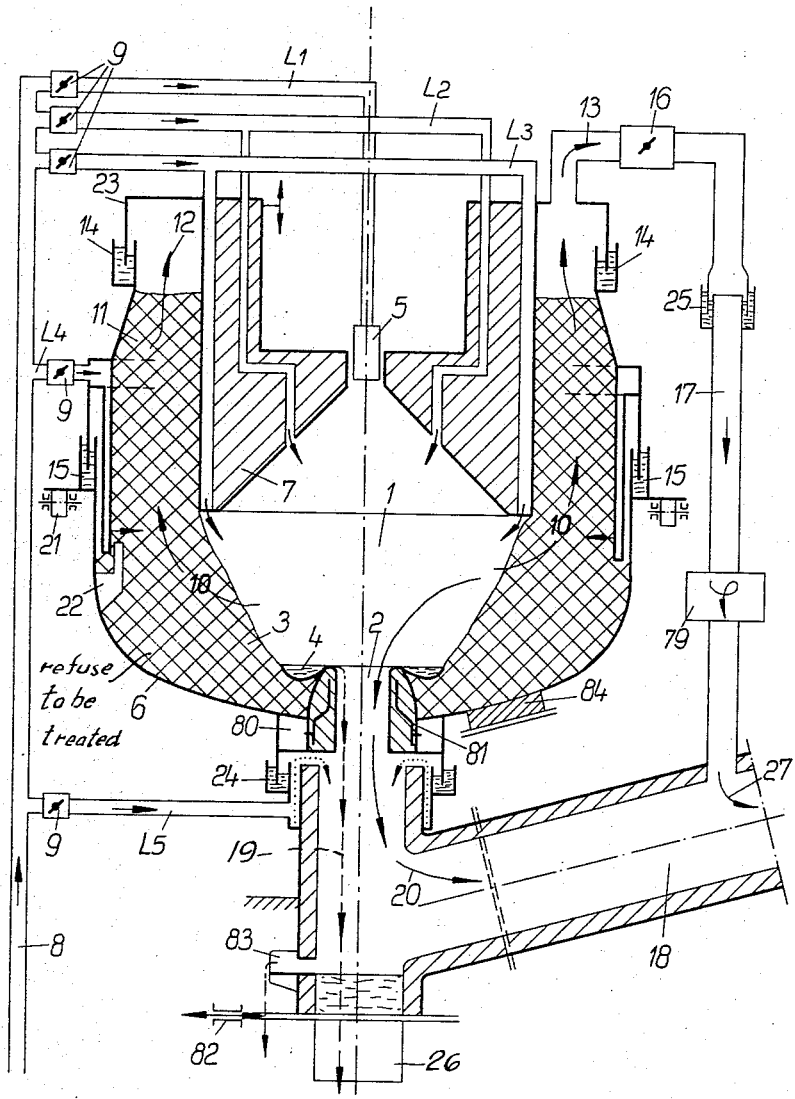
FIG. 2 shows an elevational view partly in section and partly broken away of a first embodiment of a flame chamber and a post-combustion chamber.

As shown in FIG. 2, in the flame chamber 1 there is formed a slopping funnel with surface layer 3 of the waste material, which is contained in a furnace constituted by the outer jacket or casing 6 and body 7. The casing 6 provided with a central lower outlet 2 for discharge of the smelted products and for the greatest part of the reaction gases. A heat source 5 is mounted in the body 7, which is vertically movable and which forms at the bottom thereof a reflecting roof for the flame chamber and defines with the jacket 6 an annular passageway or feed shaft 11. Due to the vertical adjustment of the body 7, the volume of the flame chamber may be adjusted as well as in the formation of the surface of the sloping funnel 3, which is a function of the natural sloping angle of the particular waste material.

The entire supply of air 8 to the flame chamber, by which the same is put under pressure, is subdivided into several partial currents $L_1$ to $L_5$, which can be regulated by valves 9.

A portion 10 of the reaction gases flow upwardly from the flame chamber 1 through the incoming waste material and are effective to predry the waste material in the feed shaft 11. The material flows downwardly in counter-current with the reaction gases and the latter absorb moisture and are discharged through outlet 13, as controlled by valve 16 to the pipe 17 and then to the post-combustion chamber 18. The circulation may be supplemented by a centrifugal blower 79. The reaction gases from pipe 17 mix in the post-comubustion chamber 18 with the portion 20 of the flame-chamber waste gases, which leave the flame chamber downwardly directly through the outlet 2.

The casing 6 is rotatably supported on rollers 21 and is provided, for example, with dogs 22 extending into and engaging the waste material. The casing may be agitated in well known manner in order to further induce movement of the waste material. In order to permit rotational movement of the jacket 6 and vertical movement of the body 7 while maintaining an air-tight closure, there are provided water seals 14, 15, 24, and 25. A cover 23 closes the feed shaft 11. The reaction gases 20 are mixed with the waste gases 12 and are discharged through the outlet 27 of the post-combustion chamber 18. The liquid melt 19 is discharged downwardly from the flame chamber 1 through the central outlet 2 to the post treatment device 26. The central outlet 2 is surrounded by an annular cooling chamber 80. Heat absorbing metallic strips 81 extend from said cooling chamber 80 radially inwardly into the ceramic inner lining of the outlet to promote heat exchange.

The outflow of the melt in a downward direction into the post treatment device 26 may be cut off by a slide valve 82, causing the melt thereby to flow out at a higher level laterally through a special drain or outlet 83 and to enter the post treatment device 26 at a different location, in which case this melt can be treated differently than when directly draining the melt downwardly.

A manhole 84, adapted for being opened as desired, is in the arched outer bottom of the jacket 6. Opening 84 makes it possible to empty the material from the flame chamber and permit entry into the latter.

Figure 3:
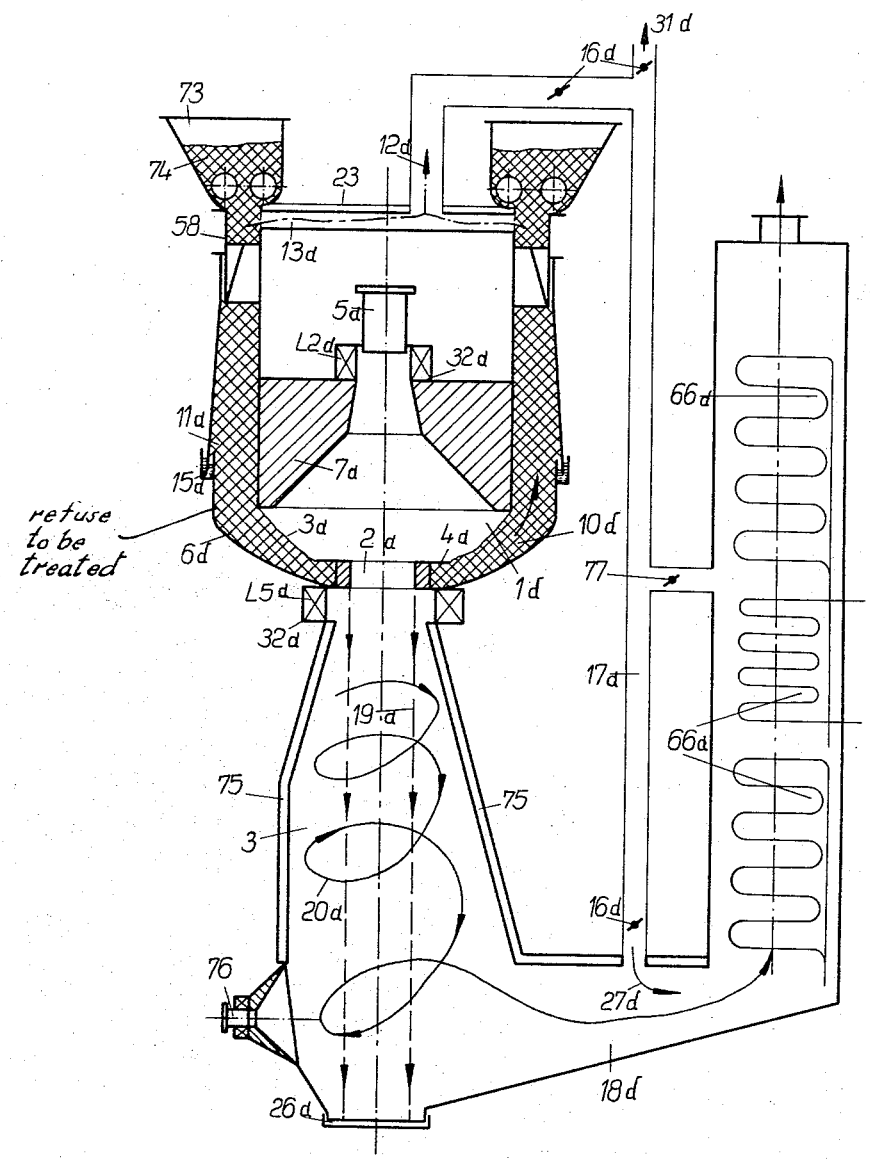
FIG. 3 is an elevational view showing the flame chamber as part of a steam generator.

In FIG. 3, the flame chamber $1d$ and the devices associated therewith are in turn associated with a main steam generator $66d$. A waste fuel product of high moisture content and varying physical properties is fed, for example, into hoppers 73, in which are supported rollers 74 which subject the waste product to a preliminary crushing and thorough mixing after which the waste product is removed in said shaft $11d$. The moisture in the product is removed in said shaft by the passage of hot reaction gases $10d$ which ascend in counter-current from the flame chamber $1d$. The reaction gases with entrained moisture leave the feed shaft at $13d$ in the form of waste gas $12d$. The discharge of the reaction gases is controlled by valves $16d$ and the reaction gases can be discharged directly into the atomosphere at $31d$. In this manner, the combustion process indicated in FIG. 3 solves very simply the drying problem and thereby eliminates feeding the fire chamber $1d$ and boiler $66d$ with the water content of the waste gases. This makes it possible to burn waste fuel without prior external preliminary crushing and fine-grinding or predrying, in a single closed process operating at high thermal efficiency. Furthermore, there is obtained the fusible removal of the non-combustible matter $19d$ practically without dust waste in the waste gas $20d$ in the manner of a melting chamber boiler, and thereby substantial economic advantages as regards structure and operation are produced.

In this case, the post-combustion chamber $18d$ is connected to the actual steam generator $66d$ by a pipe-lined wall 75. An additional heat source 76 supplements the steam generator $66d$ even if the heat contact of the waste fuel product fluctuates. If the waste gases $12d$ from the feed shaft $11d$ are to be utilized for any possible portion of combustible matter contained therein, or if the gases $12d$ are to be superheated in special cases for purposes of deodorizing, the gases $12d$ will be conducted, for example, at $27d$ into the post-combustion chamber $18d$ or into the steam generator $66d$ via valve 77 at a level in the generator corresponding to the temperature of the gases.

Figure 4:
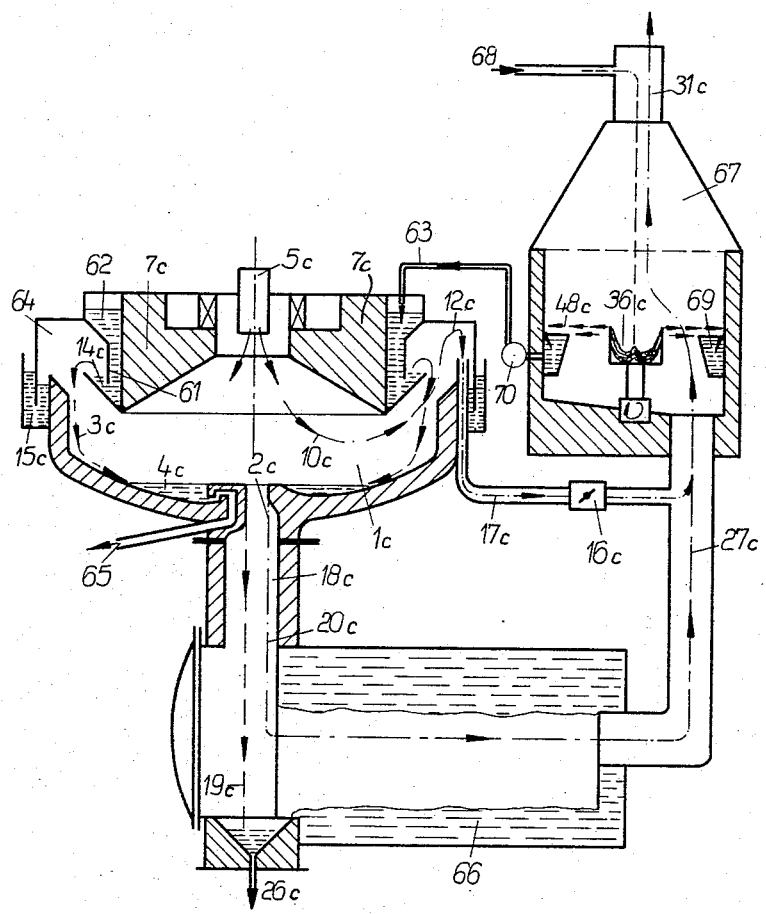
FIG. 4 diagrammatically shows the treatment of liquid waste materials both in the flame chamber and in a spray dryer heated by the waste gases while also showing a waste-heat boiler.

FIG. 4 illustrates apparatus for the treatment of liquid waste. In this case displaceable body $7c$ is provided at its bottom with a cup constituted by an outwardly and upwardly opening annular flange $14c$, in which is immersed annular jacket 61 of an upper filling funnel 62. Upon filling the cup with liquid waste, there is caused downward overflow in the form of a liquid haze $3c$, into the flame chamber $1c$. Reaction gases $10c$ leave the flame chamber $1c$ and pass through said haze with a drying action and collect in the annular duct 64, which is sealed by an outer water seal $15c$. Accordingly, the waste gases $12c$ after having effected drying, must pass through the drain $17c$ which allows them to enter, by way of valve $16c$, the main stream of waste gas $27c$ which is discharged from boiler 66.

The pretreated material collects at the bottom of the flame chamber $1c$ as shown at $4c$, with an increasing content of solids. Due to the action of the heat source $5c$, the fusible portion $19c$ of said solids is conducted downwardly through the central outlet $2c$ into the post treatment chamber $26c$. A portion of the melt may be discharged continuously through a siphon drain 65. The reaction gases $20c$ give up heat in the heat exchanger 66. After the loss of heat, the reaction gases $20c$ are introduced into a spray dryer 67 in the form of gases $27c$. In said spray dryer 67, a first stage 68 of the liquid material to be treated, for example, wet sewage sludge, is deposited onto a rapidly rotating container and is divided to form a spray layer $48c$ consisting of very fine particles of substantially equal size. The waste gas $27c$ passes through said spray layer $48c$ from therebeneath to remove a portion of the water therefrom and discharge the same from the dryer at $31c$. The liquid to be treated is thus subjected to a preliminary extraction of water. The thusly treated liquid collects in a gutter 69 and is fed to the filling funnel 62 through conduit 63 by a pump 70.

FIG. 4 enables a description of a particularly important operation of the process according to the invention. The liquid haze $3c$ flowing down peripherally from the annular flange $14c$ acts in the manner of a fluid filter upon the reaction gases $10c$ passing therethrough, that is to say that the pulverulent components of the reaction gases $10c$ are held back at this point and melted on the floor of the flame chamber at $4c$.

The same function is performed according to FIG. 1 by the thin melting pot layer $19e$ flowing from the surface layer $3e$ with respect to the gases 84, 85 and 89 passing therethrough. The solid or pulverulent components of these gases are therefore retained and melted at the surface layer $3e$ in the melt layer formed at that location. In this manner the reaction gases $20e$ issuing from the flame chamber in accordance with this manner of performing the invention are already filtered and dust-free.

What is claimed is:

1. A process for decomposing waste which is at least in part combustible to form dust-free gases and as well as a fused mass of the non-combustible matter, said process comprising feeding the waste into a flame chamber having a reflecting arched roof with a heat source substantially centrally located with respect to said roof, and allowing the waste to form freely an interior space of funnel shape, whereby the waste itself operates as a heat insulator in said flame chamber, said waste being thusly fed and formed by introducing the waste material through a peripheral annular passageway located above said flame chamber leading into the same, incinerating and smelting the waste in a thin surface reaction layer of the funnel shape of the waste by impressing high-temperature heat on this surface reaction layer while feeding air to the waste product in said flame chamber, to cause in the thin surface reaction layer of the funnel shape gasification and combustion of the combustible matter while on the other hand smelting the non-combustible remainder of the waste which forms the surface layer, discharging reaction gases and the fused mass of the non-combustible remainder from the flame chamber through a central outlet located in the flame chamber and recycling a portion of the reaction gases to contact fresh waste in said passageway to predry the material.

2. A process as claimed in claim 1 wherein the flame chamber is formed with a height related to the high-temperature heat requirement to decompose the waste in the thin surface layer of the funnel shape.

3. A process according to claim 1 comprising keeping the flame chamber under excess pressure.

4. A process according to claim 1 comprising agitating the material in the flame chamber.

5. Apparatus for the thermal decomposition of waste material comprising means defining a substantially cylindrical furnace including a casing, and a body in said casing having an arched surface constituting an upwardly arched roof for said furnace, said body being disposed in said casing in spaced relation therewith to define an upper peripheral annular passageway for feeding the material to said furnace to cause the material to form freely in said furnace an interior conical space opening upwardly, said furnace having a central lower outlet, the apparatus further comprising a heat source substantially centrally located in said arched roof, and means supporting said body for vertical displacement.

6. Apparatus for the thermal decomposition of waste material comprising means defining a substantially cylindrical furnace including a casing, and a body in said casing having an arched surface constituting an upwardly arched roof for said furnace, said body being disposed in said casing in spaced relation therewith to define an upper peripheral annular passageway for feeding the waste material to said furnace to cause the material to form freely in said furnace an interior conical space opening upwardly, said furnace having a central lower outlet, the apparatus further comprising a heat source substantially centrally located in said arched roof, and means supporting said body for telescoping movement within said casing.

7. Apparatus for the thermal decomposition of waste material comprising means defining a substantially cylindrical furnace including a casing, and a body in said casing having an arched surface constituting an upwardly arched roof for said furnace, said body being disposed in said casing in spaced relation therewith to define an upper peripheral annular passageway for feeding the waste material to said furnace to cause the material to form freely in said furnace an interior conical space opening upwardly, said furnace having a central lower outlet, the apparatus further comprising a heat source substantially centrally located in said arched roof, and rotating means for engaging the material in said furnace for stirring the same.

8. Appartaus as claimed in claim 7 wherein said rotating means comprises dogs secured to said casing and projecting therewith, said casing being supported for rotation.

9. Apparatus as claimed in claim 8 comprising means supporting said casing for rotation as well as oscillation.

10. Apparatus for the thermal decomposition of waste material comprising means defining a substantially cylindrical furnace including a casing, and a body in said casing having an arched surface constituting an upwardly arched roof for said furnace, said body being disposed in said casing in spaced relation therewith to define an upper peripheral annular passageway for feeding the waste material to said furnace to cause the material to form freely in said furnace an interior conical space opening upwardly, said furnace having a central lower outlet, the apparatus further comprising a heat source substantially centrally located in said arched roof, and means projecting into said annular passageway and movable therein for agitating the waste material in said passageway.

11. Apparatus for the thermal decomposition of waste material comprising means defining a substantially cylindrical furnace including a casing, and a body in said casing having an arched surface constituting an upwardly arched roof for said furnace, said body being disposed in said casing in spaced relation therewith to define an upper peripheral annular passageway for feeding the waste material to said furnace to cause the material to form freely in said furnace an interior conical space opening upwardly, said furnace having a central lower outlet, the apparatus further comprising a heat source substantially centrally located in said arched roof, said casing having a recess encircling the outlet for the accumulation of liquid melt which is produced by the heating of the waste material, and a drain opening into said recess for withdrawing a heavier portion of said melt.

12. Apparatus for the thermal decomposition of waste material comprising means defining a substantially cylindrical furnace including a casing, and a body in said casing having an arched surface constituting an upwardly arched roof for said furnace, said body being disposed in said casing in spaced relation therewith to define an upper peripheral annular passageway for feeding the waste material to said furnace to cause the material to form freely in said furnace an interior conical space opening upwardly, said furnace having a central lower outlet, the apparatus further comprising a heat source substantially centrally located in said arched roof, means for pretreating the material before the same is introduced into said passageway by subjecting the material to reaction gas from said furnace to dry the material, said means for pretreating the material comprising a spray dryer having an outlet connected to said passageway, an inlet for receiving waste material, means for advancing the waste material in the spray dryer from the inlet thereof to the outlet thereof, and means for feeding reaction gas from the furnace to the spray dryer to pass the reaction gas through the waste material in the spray dryer to thereby dry the waste material.

13. Apparatus for the thermal decomposition of waste material comprising means defining a substantially cylindrical furnace including a casing, and a body in said casing having an arched surface constituting an upwardly arched roof for said furnace, said body being disposed in said casing in spaced relation therewith to define an upper peripheral annular passageway for feeding the waste material to said furnace to cause the material to form freely in said furnace an interior conical space opening upwardly, said furnace having a central lower outlet, the apparatus further comprising a heat source substantially centrally loctaed in said arched roof, means for supplying air to the interior conical space to enable combustion, said body being provided with an annular means surrounding the heat source and guide blades in said furnace for introducing air spirally into said interior space in said furnace.

(References on following page)

References Cited

UNITED STATES PATENTS

| | | | |
|---|---|---|---|
| 794,471 | 7/1905 | Smead. | |
| 916,495 | 3/1909 | Seymour | 266—25 |
| 1,746,904 | 2/1930 | Pike | 266—25 |
| 2,165,242 | 7/1939 | Drill | 266—25 X |
| 2,503,555 | 4/1950 | Lykken | 266—29 X |
| 2,866,697 | 12/1958 | Elliott | 110—28 X |
| 2,988,023 | 6/1961 | Osswald. | |
| 3,208,411 | 9/1965 | Urban et al. | 110—10 |

FOREIGN PATENTS

| | | |
|---|---|---|
| 1,226,532 | 2/1960 | France. |
| 17,420 | 1913 | Great Brtiain. |

FREDERICK L. MATTESON, Jr., *Primary Examiner.*

H. B. RAMEY, *Assistant Examiner.*